(12) United States Patent
O'Hara

(10) Patent No.: US 11,651,290 B2
(45) Date of Patent: May 16, 2023

(54) DATA MANAGEMENT AND BOOTSTRAPPING PROCESSING FOR MACHINE LEARNING AND CLASSIFICATION DEVELOPMENT

(71) Applicant: SRC, Inc., North Syracuse, NY (US)

(72) Inventor: Sean T. O'Hara, North Syracuse, NY (US)

(73) Assignee: SRC, Inc., North Syracuse, NY (US)

(*) Notice: Subject to any disclaimer, the term of this patent is extended or adjusted under 35 U.S.C. 154(b) by 544 days.

(21) Appl. No.: 16/727,297

(22) Filed: Dec. 26, 2019

(65) Prior Publication Data

US 2021/0201171 A1   Jul. 1, 2021

(51) Int. Cl.
| | | |
|---|---|---|
| *G06F 16/00* | (2019.01) | |
| *G06N 20/20* | (2019.01) | |
| *G06N 5/04* | (2023.01) | |
| *G06N 20/00* | (2019.01) | |
| *G10L 15/06* | (2013.01) | |

(52) U.S. Cl.
CPC ............... *G06N 20/20* (2019.01); *G06N 5/04* (2013.01); *G06N 20/00* (2019.01); *G10L 15/063* (2013.01)

(58) Field of Classification Search
CPC ......... G06N 5/04; G06N 20/00; G10L 15/063
See application file for complete search history.

(56) References Cited

U.S. PATENT DOCUMENTS

2020/0143279 A1*   5/2020   West .................... G06N 3/0472

* cited by examiner

*Primary Examiner* — Hung Q Pham
(74) *Attorney, Agent, or Firm* — George McGuire

(57) ABSTRACT

A system for developing machine learning for use in the radiofrequency domain that produces a robust set of training data for machine learning from a small set of labelled training data that is bootstrapped with unlabeled electromagnetic environment data. A raw signal set is prepared from the labeled data and separately processed for any electromagnetic environment and interference signals as well as for a primary signal by applying the real electromagnetic environment data and then summed to generate a second data set that is larger than the first data set. Feature extraction is used to produce a bootstrapped labelled data set that is larger than the original labelled data set and that can be used as training data for machine language classification.

13 Claims, 3 Drawing Sheets

DATA MANAGEMENT AND BOOTSTRAPPING PROCESSING FOR MACHINE LEARNING AND CLASSIFICATION DEVELOPMENT

BACKGROUND OF THE INVENTION

1. Field of the Invention

The present invention relates to radiofrequency (RF) systems and, more particularly, to implementing machine learning in RF systems using labeled and unlabeled data sets.

2. Description of the Related Art

Machine learning in the radiofrequency (RF) field is difficult to perform due to the lack of sufficiently robust labeled data sets that can be used to train machine learning algorithms. In the absence of sufficient training data, the results of machine learning are prone to error and cannot be reliably used for the processing and interpretation of new data.

Accordingly, there is a need in the art for an approach that can allow small data sets to be developed so that machine learning can be used for classification and autonomous mission support.

BRIEF SUMMARY OF THE INVENTION

The present invention is a system for developing machine learning for use in the radiofrequency domain that can produce a robust set of training data for machine learning from a small set of training data that is bootstrapped with electromagnetic environment data. The system includes a database containing a first labelled data set and data reflecting a real electromagnetic environment and a processor programmed to retrieve the labelled data and the data reflecting the real electromagnetic environment from the database. The processor is further programmed to prepare a raw signal set from the labeled data and to separately process the raw signal set for any electromagnetic environment and interference signals as well as for a primary signal by applying the data reflecting the real electromagnetic environment to generate a second labeled data set that is larger than the first labelled data set. The processor is also programmed to perform a summation of any electromagnetic environment and interference signals and any primary signal of the raw signal set and then a feature extraction of the summed electromagnetic environment and interference signals and primary signal. The processor is also programmed to label the feature extraction from the raw signal sets. The processor is also programmed use the labelled feature extraction as training data for machine language classification. The system further includes radiofrequency hardware programmed to use the trained machine language classification to interpret new data. The processor is also programmed to perform the feature extraction using MFRF VM.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
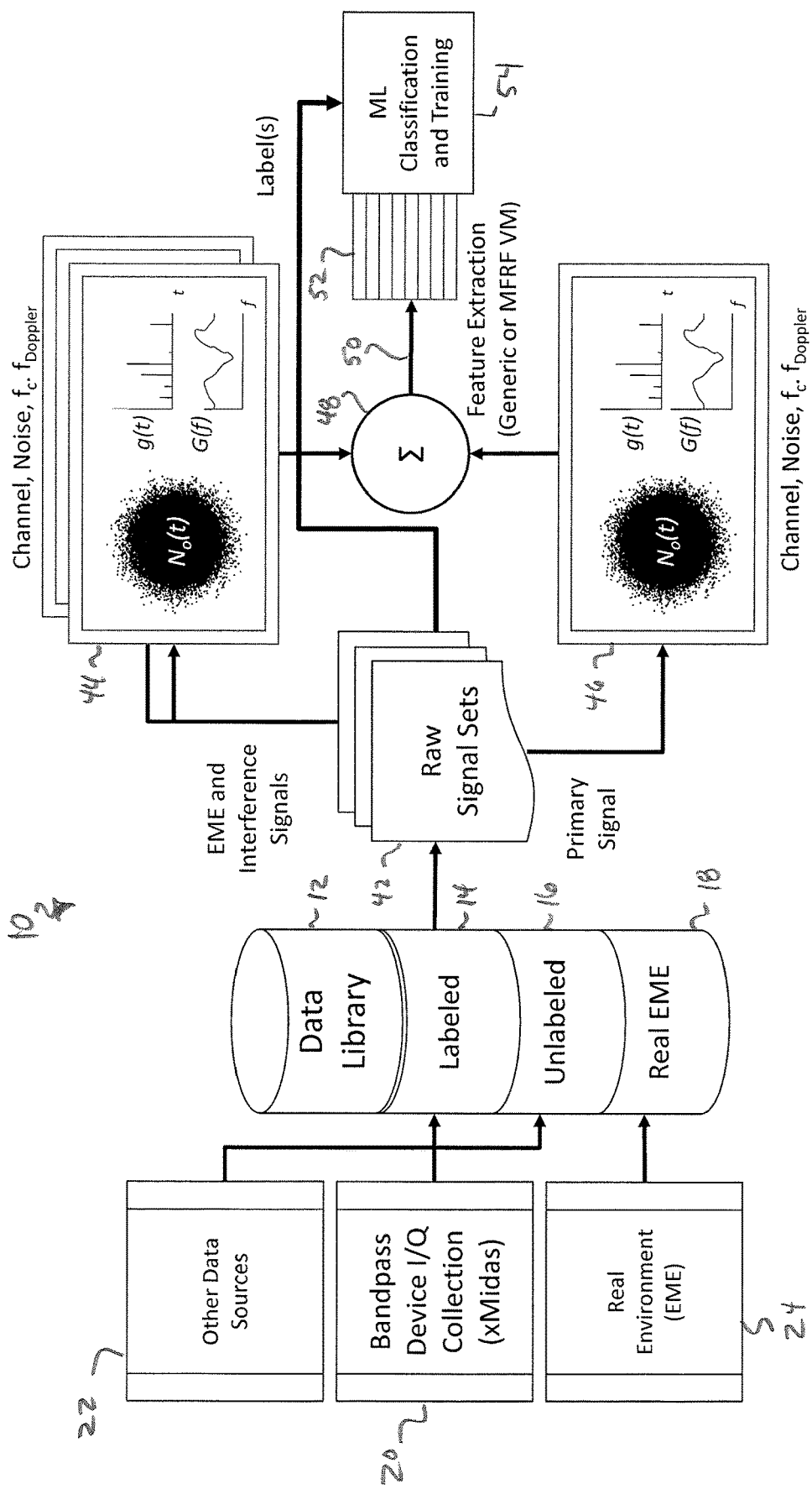
FIG. 1 is a schematic of a system for characterizing RF data for machine language applications according to the present invention.

Referring to the figures, wherein like numerals refer to like parts throughout, there is a seen in FIG. 1 a schematic of a machine learning RF system 10 according to the present invention. More specifically, RF system 10 builds a sufficiently robust set of training data using both labelled and unlabeled data to develop machine learning for RF devices in support of various RF functions such as multifunction radiofrequency and cognitive radiofrequency classifications. RF system 10 involves the collection and labeling of device characterization data (DCD), bootstrapping of the instantiations of the DCD by applying channel interference, adding combinations of other labeled and unlabeled interfering signals, and real electromagnetic environment (EME) conditions to create a large data labeled data set, and applying supervised learning to train classifiers that are robust to channel interference and EME conditions. RF system 10 thus allows for the use of real EME in training and the machine learning can be performed through feature space domains and through raw In-Phase/Quadrature (I/Q) processing. RF system 10 further includes replay and hardware in the loop evaluation and performance estimation.

Referring to FIG. 1, RF system 10 comprises a data library 12 containing labeled data 14, unlabeled data 16 (e.g., EME and collections of unknown but "not-of-interest" environments are an example of a type of unlabeled data that would be used. Unlabeled data can also be applied for applying unsupervised learning techniques for identification of relevant feature manifolds), and real electromagnetic environment (EME). Labeled data 14 is populated from a bandpass device via I/Q collection 20 using conventional RF data processing software such as X-Midas. Unlabeled data 16 is obtained from other data sources 22. Real EME 18 is obtained from EME in the real environment 24. Real EME data 18 can come from anywhere. It could be collected in urban environments, or across a large diversity in environments to assist in generalizing/teaching the algorithms to be robust to environmental effects.

As seen in FIG. 1, characterization data may be retrieved by and then processed by a high performance computing cluster (HPC) or in the cloud 40. Labeled data 14 is used to prepare a series of raw signal sets 42; it is data manipulation consisting of extracting labeled signals for growth and recombination in subsequent processing stages. The raw signal sets 42 are separately processed to determine channel, noise, carrier frequency (fc), and Doppler shift/spread ($f_{Doppler}$) for EME and interference signals 44 as well as the channel, noise, carrier frequency (fc), and Doppler shift/spread ($f_{Doppler}$) for the primary signal 46. The results of the EME and interference signal processing 44 and the primary signal processing 46 are then summed 48 and subjected to feature extraction 52, which include direct-to-deep learning extraction at the raw I/Q sample level. The feature extraction data 52 is then compared to the data labels through standard machine learning techniques and classification training procedures.

Figure 2:
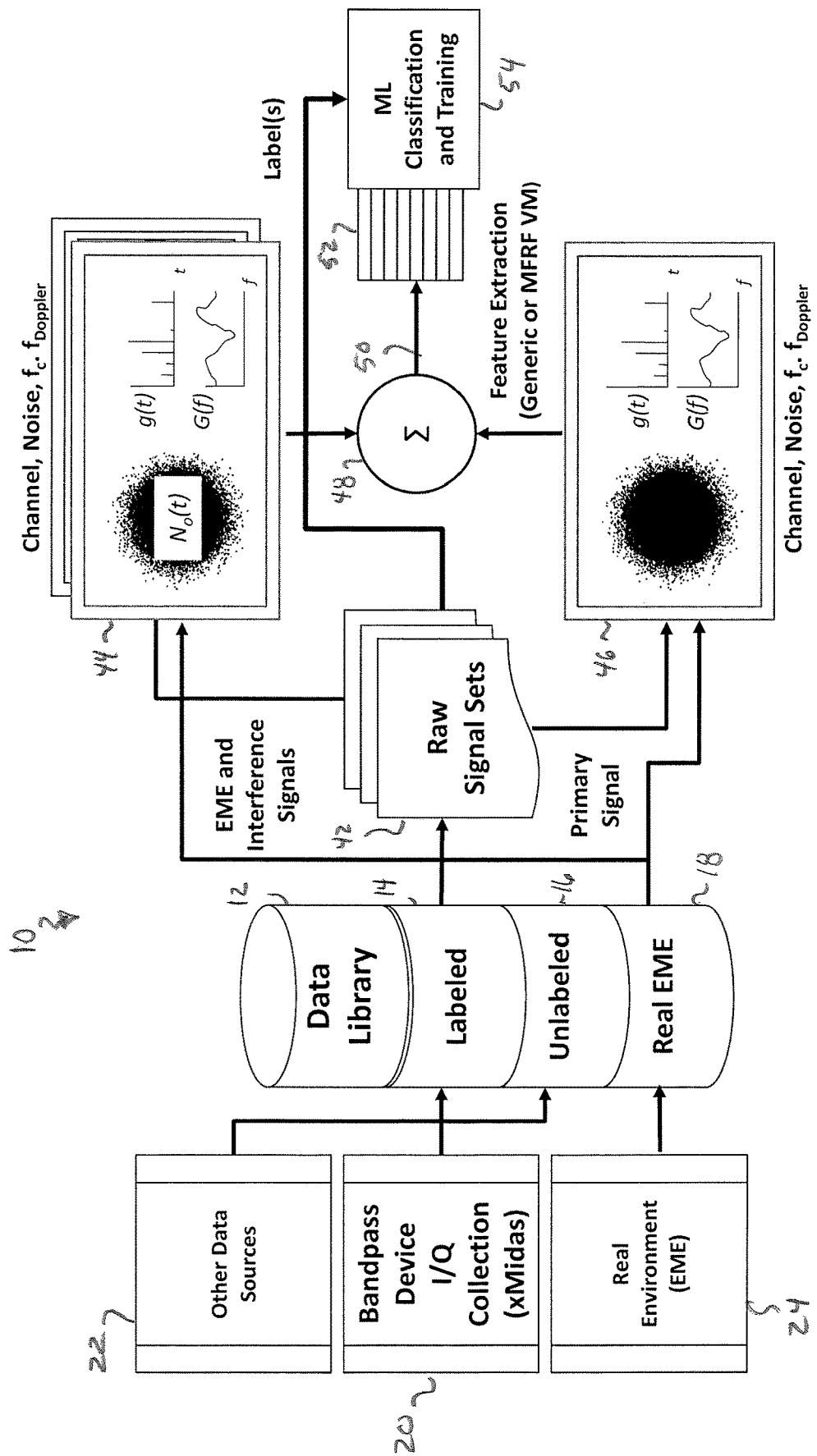
FIG. 2 is a schematic of a system for characterizing RF data along with real electromagnetic emissions for machine language applications according to the present invention.

As explained above, the smaller set of initial labelled data may not be sufficient for robust machine learning development, so the present invention provides for data growth and by combination and bootstrapping of the labelled data with real EME and other leveled data. Referring to FIG. 2, the approach of FIG. 1 may be performed using labeled data 16 from bandpass device I/Q collection (xMidas) 20 as well as EME data 18 from the real environment 24. The real data is, in essence, combined to try to obscure the known signals and then used to confirm that the known signals were properly identified; it is also to train the classification networks to learn to de-interleave and classify signals that are simultaneously present. In this scenario, real EME data 18 is used in EME and interference signal processing 44 as well as in primary signal processing 46. The resulting feature extraction 50 is used for labeling of raw signal sets 52 for machine language classification and training 54.

Figure 3:
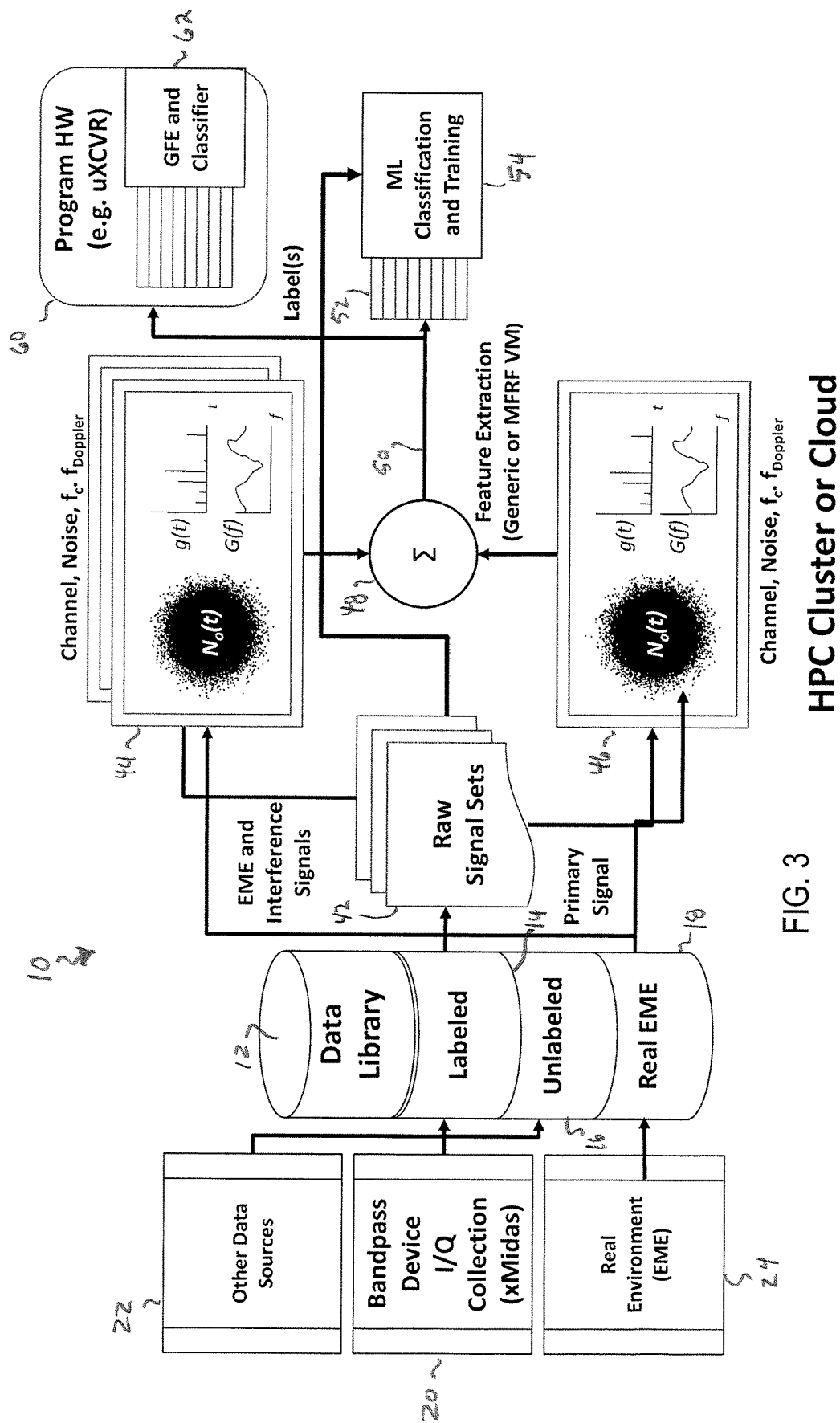
FIG. 3 is a schematic of a system for using characterizing RF data along with the real electromagnetic environment for machine language based programming of RF hardware according to the present invention.

Referring to FIG. 3, the machine language classification and training is used to program the relevant hardware 60, such as an RF transceiver (uXCVR), using applicable programming techniques such as a General Forwarding Element (GFE) and Classifier 62.

As described above, training data is generated through bootstrapping labeled data with itself and with other random processes to generate a large volume of data. This approach involves the use of combinations of signals at differing fc and S/(ΣI+N) levels. Channel processes are applied to S/(ΣI+N) include multipath conditions, which includes time delay spread and frequency selective fading effects, an infinite number of channel conditions, and Doppler shift/spread, (Doppler. Generalized unlabeled EME thus can be mixed with labeled data. In the present invention, Device I/Q Samples will need to capture all possible modalities in the waveform.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for developing a set of training data for the use of machine learning in the radiofrequency domain, comprising:
    a database containing a first labelled data set and a set of data reflecting a real electromagnetic environment;
    a processor programmed
    to retrieve the first labelled data set and the set of data reflecting the real electromagnetic environment from the database,
    wherein the processor is further programmed
    to prepare a raw signal set from the first labeled data set, wherein the raw signal set is obscured with the set of data reflecting the real electromagnetic environment,
    to separately process the raw signal set after it has been obscured with the set of data reflecting a real electromagnetic environment to characterize electromagnetic environment and interference signals in the raw signal set, and to characterize primary signals in the raw signal set to generate a second labeled data set by summing the characterized electromagnetic environment and interference signals and the characterized primary signals, wherein the generated second labeled data set is larger than the first labelled data set and is provided to a machine language classification and training system.

2. The system of claim 1, wherein the processor is programmed to perform a feature extraction of the summed characterization of the electromagnetic environment and interference signals and the primary signal.

3. The system of claim 2, wherein processor is programmed to label the feature extraction.

4. The system of claim 3, wherein the processor is programmed use the labelled feature extraction as training data for machine language classification.

5. The system of claim 4, wherein the system further includes radiofrequency hardware programmed to use the trained machine language classification to interpret new data.

6. The system of claim 5, wherein the processor is programmed to perform the feature extraction using multifunction radiofrequency vector multiplication.

7. A method of using machine learning in an RF environment, comprising the steps of:
    compiling a database with a first labelled data set and a set of data reflecting a real electromagnetic environment;
    retrieving the first labelled data and the set of data reflecting the real electromagnetic environment from the database;
    preparing a raw signal set from the labeled data, wherein the raw signal set is obscured with the set of data reflecting the real electromagnetic environment;
    processing the obscured raw signal set to characterize electromagnetic environment and interference signals in the raw signal set;
    processing the obscured raw signal set to characterize primary signals; and
    generating a second labeled data set by summing the characterized electromagnetic environment and interference signals and the characterized primary signals, wherein the generated second labeled data set is larger than the first labelled data set and is provided to a machine language classification and training system.

8. The method of claim 7, further comprising the step of performing a summation of the characterized electromagnetic environment and interference and the characterized primary signal of the raw signal set.

9. The method of claim 8, further comprising the step of performing a feature extraction of the summed electromagnetic environment and interference and the primary signal.

10. The method of claim 9, further comprising the step of labelling the raw signal set using the feature extraction.

11. The method of claim 10, further comprising the step of using the labelled raw signal set as training data for machine language classification.

12. The method of claim 11, further comprising the step of programming radiofrequency hardware to use the trained machine language classification to interpret new data.

13. The system of claim 12, wherein the step of performing the feature extraction is accomplished using multifunction radiofrequency vector multiplication.

* * * * *